United States Patent
Fahrbach

[15] 3,675,192
[45] July 4, 1972

[54] ARRANGEMENT FOR ESTABLISHING THE SPEED OF FLOW OF BLOOD

[72] Inventor: Kurt Erich Fahrbach, Wiesbaden-Schierstein, Germany

[73] Assignee: Siemens Aktiengesellschaft, Erlangen, Germany

[22] Filed: Sept. 12, 1969

[21] Appl. No.: 857,391

[30] Foreign Application Priority Data

Sept. 28, 1968 Germany.......................P 17 91 191.0

[52] U.S. Cl. .............................340/3 D, 73/194 A, 340/3 R
[51] Int. Cl.............................................................G01s 9/66
[58] Field of Search.........................340/1, 3, 3 D; 73/194 A

[56] References Cited

UNITED STATES PATENTS 3,121,856  2/1964  Finney.........................................340/3
3,498,290  3/1970  Shaw et al............................73/194 X Primary Examiner—Richard A. Farley
Attorney—Richards & Geier

[57] ABSTRACT

A device for determining the speed of blood flow in blood vessels uses the ultrasonic Doppler effect method and includes an ultrasonic transmitter and a receiver for receiving ultrasounds reflected from the flowing blood as well as means determining a value proportional to the speed of the blood flow from the transmitting and receiving frequencies. The device is particularly characterized by a measuring device which measures the amplitudes of several selected frequencies within the frequency spectrum of the reflected ultrasonic wave or when using a member connected with the ultrasonic receiver for providing the difference between the receiving and transmitting frequencies within the frequency spectrum of the differential signal, the measuring device being connected with a calculating device.

3 Claims, 2 Drawing Figures

INVENTOR:
K. E. Fahrbach
BY
Richards y Geier
ATTORNEYS

ARRANGEMENT FOR ESTABLISHING THE SPEED OF FLOW OF BLOOD

The present invention relates to an arrangement for establishing the speed of flow of blood in blood vessels by means of the ultrasonic Doppler effect method, having an ultrasonic transmitter and a receiver for receiving the ultrasonic energy (of the echo signals) reflected on the flowing blood, as well as means for determining a value proportional to the speed of flow of blood from the transmission and reception frequencies.

One known instrument of this type operates in such a way that the ultrasonic energy of specific frequency ($f_s$) transmitted by a piezoelectric vibrator is directed on to the blood vessel to be examined, and that the ultrasonic energy reflected on the flowing blood is received by an ultrasonic receiver, which can be identical with the piezoelectric transmission vibrator, which supplies its electrical output signals to a circuit for further processing. This circuit contains an element for forming the difference ($f_D$) between the received frequency ($f_E$) and the transmission frequency ($f_s$) and also an element for converting the difference frequency ($f_s$) into an output direct voltage which is proportional to this frequency and which constitutes a standard for the speed of blood flow which is to be established.

The flow speeds established with such known arrangements frequently differ from the actual speed (more especially the values measured are frequently too small) in such a way that these arrangements are not entirely suitable for use for quantitative establishment of the speed of flow of blood in medicine.

It is the object of the present invention to provide an arrangement which, while retaining the measuring method by means of ultrasonic Doppler effect, supplies more accurate measurement values and thus is suitable for being used in medicine.

The basis of the invention is numerous examinations and considerations as to why the known arrangements provide incorrect measurement results. By way of example, it was found that the known arrangements, with strictly turbulent flow, supply measurement results showing good conformity with the actual values. Because of this fact and because of the circumstance that approximately the same speed prevails throughout the entire vessel cross-section with strictly turbulent flow, the opinion was confirmed that strict turbulence obviously does not prevail in the vessel during a pulsation and that the incorrect measurements obtained with the known arrangements do not take this fact into account.

More thorough investigations confirm that, during a pulsation, the flow profile (speed distribution throughout the cross-section of the vessel) of the flowing blood actually shows constant variation. Starting from this fact, the invention is based on the knowledge that more accurate measurements are only possible if this given condition is also taken into account with the technical measurement. The interpretation and sufficiently accurate evaluation of the flow profile at the time did however only seem to be possible at untenably great expense.

It is to the merit of the inventor that he has nevertheless found a method for the quantitative accurate determination of the speed of flow with flow profiles which show quick and extremely strong changes. According to the present invention a device of the described type is provided with a measuring device which measures the amplitudes of several selected frequencies within the frequency spectrum of the reflected ultrasound wave or when a member is used connected with the ultrasound receiver for providing the difference between the receiving and transmitting frequencies within the frequency spectrum of the differential signal, as well as a calculating device connected with the measuring device.

The solution according to the invention takes into account the fact that, with a flow of any arbitrary flow profile of each flowing particle, a (Doppler) frequency shift corresponding to the speed of this particle is caused, and that therefore a frequency mixture is received by the ultrasonic receiver, the frequency reflected by stationary particles corresponding to the transmission frequency and the frequency reflected by the fastest particles showing the greatest deviation from the transmission frequency. Corresponding to the quantity of particles of the same speed, therefore, the energy reflected by these particles shows a certain intensity. With the arrangement according to the invention, it is possible to establish the intensity of the received echo signals with the separate frequencies from the received frequency mixture (either by evaluating the frequency spectrum of the reflected ultrasound wave or of the differential signal) and to calculate the mean speed of flow from these values. By "mean speed" is understood here the throughflow quantity per unit of time, related to the cross-section of the vessel. According to an advantageous embodiment of the present invention the measuring device consists of filters tuned to individual selected frequencies (for example, resonance filters or sharply tuned active band passes) with following peak detectors (which serve as an instrument measuring the amplitude or contain RC combinations), whereby the resonance frequencies of the filters should preferably differ from each other to the extent of a predetermined unvariable amount. The calculating device thus consists substantially out of:

a. a first summing member directly following all peak detectors, b. a second summing member following all peak detectors over proportional members which are adjustable to a value proportional to the resonance frequency of the corresponding filter, and c. a division member providing a quotient from the outgoing signals of the second and first summing members.

When filters are used the evaluation of the frequency spectrum of the differential signal is most advantageous since the required resonance filters can be set more precisely to small frequencies than the frequencies only slightly different from the transmitting frequency. Adequate measuring results are produced when in case of an expected frequency spectrum of $f=6,000$ Hz a total of 12 filters are used the resonance frequencies of which differ from each other to the extent of $\Delta f = 500$ Hz.

Details and further advantages of the invention are hereinafter explained by reference to a constructional example in two figures, wherein.

Figure 1:
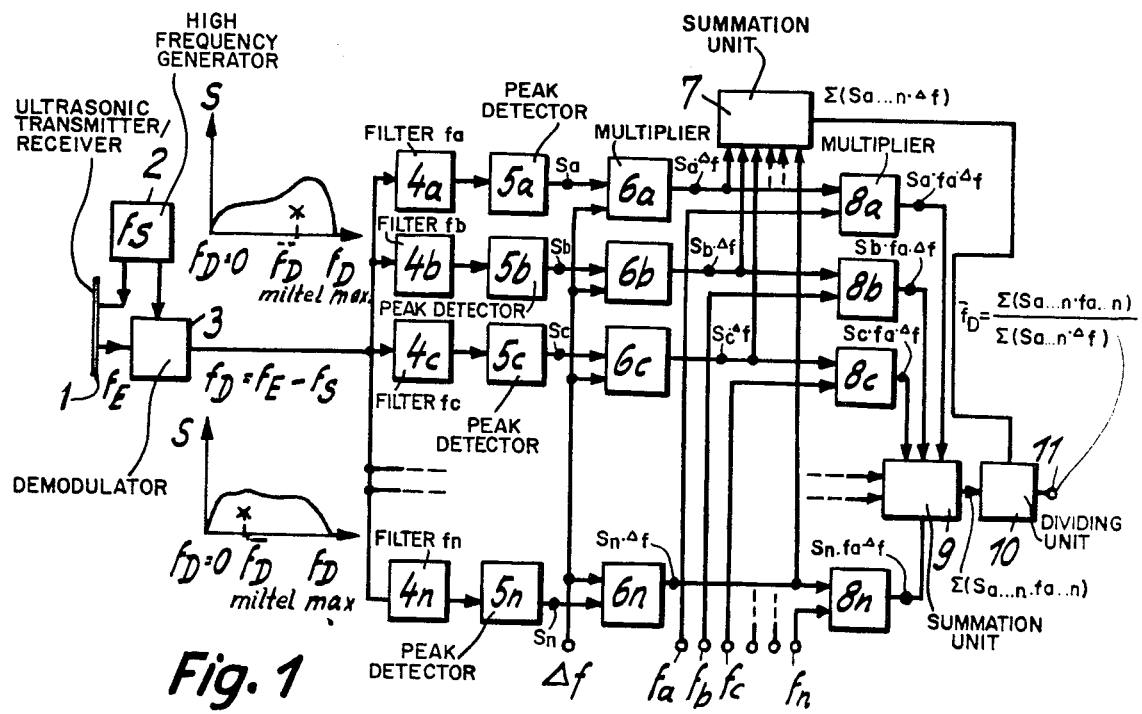
FIG. 1 shows a block circuit diagram of the invention.

It is shown in these block circuit diagrams that the ultrasonic transmitter/receiver 1 is supplied by the high-frequency generator 2 with the frequency $f_S$ (= 5 Mc/s). The ultrasonic transmitter/receiver picks up the echo ($f_E$) of different frequency returning from the sounded blood vessel (not shown) and passes it on to the difference member (demodulator) 3, which forms the difference $|f_D| = f_E - f_S$. Consequently, at the output of the difference member, there is established a frequency mixture, the intensity distribution of which can have the form which is shown in the two graphlike representations (at the output of the difference member 3) in FIG. 1. The smallest frequency ($f_D = 0$) originates from the slowest (stationary) blood corpuscles in the vessel being examined and the upper limiting frequency $f_{D_{max}}$ originates from the fastest blood corpuscles. The graphs therefore show the intensity S of the separate frequencies of the frequency mixture. This frequency mixture is fed to the filters 4a,b,c, ... n, of which the resonance frequency differs in each case by the same amount ($\Delta f$) and, in the constructional example, which provides 12 resonance filters, $\Delta f = 500$ c/s. For the sake of clarity in the figures, only the first three filters and the last filter are shown (4a,b,c, ... n); the same also applies to the elements (5a,b,c, ... n); (6a,b,c, ... n); (8a,b,c, ... n); (12a,b,c, ... n) and ($f_{a,b,c,...n}$) which are later to be described. It is determined by the peak detectors 5a,b,c, ... n (amplitude measuring instrument) which amplitude has that frequency of the frequency mixture which is selected by the filters. It can be shown that the mean Doppler frequency corresponding to the mean speed $\bar{v}$ in the blood vessel is $$f_{D\,\text{mean}} = \frac{\sum\limits_{a}^{n} (S_{a\ldots n} \cdot f_{a\ldots n})\Delta f}{\sum\limits_{a}^{n} (S_{a\ldots n} \cdot \Delta f)} = \bar{f}_D$$

in which $S_{a\ldots n}$ = the intensities determined by the peak detectors of certain frequencies selected by the resonance filters, $f_a \ldots n$ = the actual frequency of the associated resonance filter and $\Delta f$ gives the frequency interval of the separate filters, which is in all cases chosen to be of equal value. $f_D$ is however at the same time the standard for the mean speed $v$ which is to be examined. This equation is allowed for by the additional circuit, in that the output value supplied in each case by the peak detectors is multiplied in the multiplying elements $6a,b,c,\ldots n$ with the frequency spacing $\Delta f$ of the separate resonance filters. The products thus determined are firstly all supplied to the summation unit 7 and secondly are separately multiplied in additional multiplying units $8a \ldots n$, in each case with the resonance frequency $f_a, f_b \ldots f_n$ of the corresponding associated resonance filters. The products obtained therein are supplied to a second summation unit 9, which is connected through the dividing unit 10 to the first summation unit 7. A value proportional to the mean speed $v$ can then be obtained at the output 11 of the dividing unit and optionally can be supplied to an indicating or recording instrument.

The equation for $f_D$ as indicated above can be simplified if, as effected, the frequency spacing of the filters is in each case chosen to be of equal size, so that $$\bar{f}_D \text{ (or } \bar{v}) = \left[\sum_{a}^{n} (S_{a\ldots n} \cdot f_{a\ldots n})\right] : \left[\sum_{a}^{n} S_{a\ldots n}\right].$$

Figure 2:
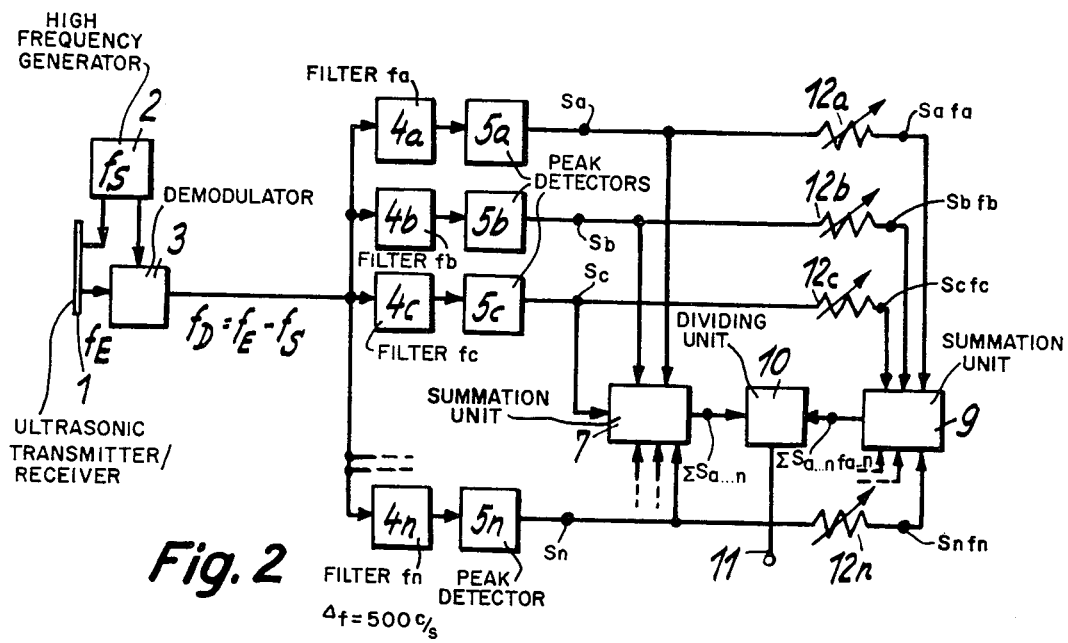
FIG. 2 shows a simplified block circuit diagram of the invention.

In corresponding manner, as shown in FIG. 2, the multiplying units $6a \ldots n$ only provided in FIG. 1 can be omitted. The multiplying units $8a \ldots n$ according to FIG. 1 can be replaced by potentiometers (voltage dividers) $12a \ldots n$, of which the adjusted value merely has to be a standard for the value of the separate resonance frequencies $f_a \ldots n$ of the filters.

According to these simplifications, therefore, the peak detectors in FIG. 2 are firstly connected directly to the first summation unit 7 and secondly through the potentiometers $12a \ldots n$ to the second summation unit 9. Associated with the division unit 10 is an adjusting unit (not shown), which is intended for calibration and constructed as a potentiometer.

This comparatively simple circuit according to FIG. 2 also permits the continuous establishment of the hitherto unachievable instantaneous mean speeds of flowing media with changing speed profiles. The arrangement according to the invention is not only suitable for its special purpose of use (the establishment of the speed of flow of blood), but is universally suitable for the measurement of flowing media and more especially liquid media.

I claim:

1. A device for determining the speed of blood flow from blood vessels which uses the ultrasonic Doppler effect method, said device comprising an ultrasonic transmitter, a receiver for receiving ultrasounds reflected from the flowing blood, a measuring device for measuring amplitudes of several individual selected frequencies within the frequency spectrum of the reflected ultrasonic wave, or when using a member connected with said ultrasonic receiver for providing a difference between the receiving and transmitting frequencies within the frequency spectrum of the differential signal, said measuring device consisting of filters set to the individual selected frequencies which differ from each other to the extent of a predetermined unvariable value and peak detectors connected with and following said filters, and a calculating device comprising a second summing member directly following and connected with all peak detectors, a first summing member, proportioning members connected with all peak detectors and said first summing member and adjustable to a value proportional to the resonance frequency of the corresponding filter and a division member for providing a quotient from the outgoing signals of the first and second summing members.

2. A blood flow measuring device according to claim 1, wherein said proportioning members consist of adjustable potentiometers.

3. A blood flow measuring device according to claim 1, comprising an indicating device connected to the outlet of said division member for indicating or registering outgoing values proportional to the average blood flow speed.

* * * * *